US012738013B2

(12) United States Patent
Lee et al.

(10) Patent No.: US 12,738,013 B2
(45) Date of Patent: Sep. 15, 2026

(54) SCANNING ELECTRON MICROSCOPE IMAGE PROCESSING USING NEURAL NETWORK

(71) Applicant: SAMSUNG ELECTRONICS CO., LTD., Suwon-si (KR)

(72) Inventors: Hojoon Lee, Suwon-si (KR); Seoyeon Park, Suwon-si (KR); Seongryeol Kim, Suwon-si (KR); Ilkwon Kim, Suwon-si (KR); Sanggul Park, Suwon-si (KR); Younggu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 474 days.

(21) Appl. No.: 18/233,385

(22) Filed: Aug. 14, 2023

(65) Prior Publication Data

US 2024/0071033 A1 Feb. 29, 2024

(30) Foreign Application Priority Data

Aug. 26, 2022 (KR) ........................ 10-2022-0107902

(51) Int. Cl.
*G06T 7/11* (2017.01)
*G06T 5/50* (2006.01)
(Continued)

(52) U.S. Cl.
CPC ................ *G06V 10/26* (2022.01); *G06T 5/50* (2013.01); *G06T 7/11* (2017.01); *G06V 10/774* (2022.01);
(Continued)

(58) Field of Classification Search
CPC ...... G06V 10/454; G06V 10/82; G06V 10/26; G06V 10/774; G06V 20/69; G06V 20/695;
(Continued)

(56) References Cited

U.S. PATENT DOCUMENTS 7,170,593 B2 1/2007 Honda et al.
7,507,961 B2 3/2009 Toyoda et al.
(Continued)

FOREIGN PATENT DOCUMENTS

KR 101969242 4/2019
KR 1020210033496 3/2021

OTHER PUBLICATIONS

Diego Carrera et al., "Defect Detection in SEM Images of Nanofibrous Materials", IEEE Transactions on Industrial Informatics, Apr. 2017, 551-561, vol. 13, Issue 2, IEEE.
(Continued)

*Primary Examiner* — Andrew W Bee
(74) *Attorney, Agent, or Firm* — Fish & Richardson P.C.

(57) ABSTRACT

A neural network device includes: (1) a pre-processor configured to select target images from scanning electron microscope (SEM) images, based on frequencies respectively corresponding to the SEM images, and crop each of the target images into a plurality of cropped images; (2) a neural network processor configured to generate a crop detection image by inferring a target object from each of the plurality of cropped images by using a segmentation model trained to detect the target object in each of the plurality of cropped images; and (3) a post-processor configured to merge crop detection images with each other in a same size as the SEM images, based on position information of the plurality of cropped images.

14 Claims, 14 Drawing Sheets

(51) Int. Cl.

| | |
|---|---|
| ***G06V 10/26*** | (2022.01) |
| ***G06V 10/774*** | (2022.01) |
| ***G06V 10/82*** | (2022.01) |

(52) U.S. Cl.
CPC .... *G06V 10/82* (2022.01); *G06T 2207/10061* (2013.01); *G06T 2207/20021* (2013.01); *G06T 2207/20081* (2013.01); *G06T 2207/20084* (2013.01); *G06T 2207/20132* (2013.01); *G06T 2207/20221* (2013.01)

(58) Field of Classification Search
CPC . G06T 2207/10061; G06T 2207/20081; G06T 2207/20084; G06T 5/50; G06T 2207/20021; G06T 2207/20132; G06T 2207/20221; G06T 3/4084; G06T 7/11; G06T 7/136; G06N 3/096
See application file for complete search history.

(56) References Cited

U.S. PATENT DOCUMENTS

| | | | | |
|---|---|---|---|---|
| 10,254,236 | B2 | 4/2019 | Shim et al. | |
| 10,755,396 | B2 | 8/2020 | Enyama et al. | |
| 2017/0177997 | A1 | 6/2017 | Karlinsky et al. | |
| 2020/0143099 | A1* | 5/2020 | Wu ....................... | G06F 30/398 |
| 2022/0108436 | A1 | 4/2022 | Kang et al. | |
| 2022/0139072 | A1 | 5/2022 | Klaiman et al. | |
| 2022/0351359 | A1 | 11/2022 | Zhang et al. | |
| 2025/0014323 | A1* | 1/2025 | Pawlowicz .......... | G06V 10/774 |

OTHER PUBLICATIONS

Zhucheng Chen et al., “Deep Learning-Based Method for SEM Image Segmentation in Mineral Characterization, an Example From Duvernay Shale Samples in Western Canada Sedimentary Basin”, Elsevier Computers and Geosciences.
Nati Ofir et al., Automatic Defect Segmentation by Unsupervised Anomaly Learning, Jun. 3, 2022, Applied Materials.

* cited by examiner

SCANNING ELECTRON MICROSCOPE IMAGE PROCESSING USING NEURAL NETWORK

CROSS-REFERENCE TO RELATED APPLICATION

This application is based on and claims priority under 35 U.S.C. § 119 to Korean Patent Application No. 10-2022-0107902, filed on Aug. 26, 2022, in the Korean Intellectual Property Office, the disclosure of which is incorporated by reference herein in its entirety.

BACKGROUND

The disclosure relates to a neural network device and, more particularly, to a neural network device including a neural network processor and an operating method of the neural network device.

Scanning electron microscopes (SEMs) may radiate an input electron beam to an analysis target, detect electrons emitted from the analysis target, and generate an SEM image.

SEMs have enabled microstructures, which are immeasurable because of the resolution limit of optical microscopes, to be observed and thus are widely used in various fields, such as medicine, biotechnology, biology, microbiology, materials engineering, food engineering, and the like. SEMs may generate an SEM image of an analysis target. The analysis target may be analyzed using the SEM image. In particular, SEM images may be used to analyze defects of semiconductor wafers, circuit patterns used for circuit design, and the like.

To detect a target object to be analyzed in an analysis target, image processing may be performed on an SEM image. The image-processed SEM image may be used for analysis. When the analysis target is analyzed by performing image processing of the SEM image, a method of decreasing the time taken for image processing and increasing analysis consistency by increasing the clarity of the image-processed SEM image is desired.

SUMMARY

The disclosure provides a neural network device for generating an image detecting a target object from a scanning electron microscope (SEM) image by using a neural network model and an operating method of the neural network device.

According to an aspect of the disclosure, there is provided a neural network device including a pre-processor configured to select target images from SEM images, based on frequencies respectively corresponding to the SEM images, and crop each of the target images into a plurality of cropped images. A neural network processor is configured to generate a crop detection image by inferring a target object from each of the plurality of cropped images by using a segmentation model trained to detect the target object in each of the plurality of cropped images. A post-processor is configured to merge crop detection images with each other in a same size as the SEM images, based on position information of the plurality of cropped images.

According to another aspect of the disclosure, there is provided a system including at least one processor and a non-transitory storage medium storing instructions to allow the at least one processor to perform image processing when the instructions are executed by the at least one processor. The image processing includes obtaining N SEM images from an SEM with respect to an analysis target, selecting M target images from the N SEM images, based on frequencies respectively corresponding to the N SEM images, cropping each of the M target images into K cropped images, generating M×K crop detection images by inferring a target object, to which each of pixels of M×K cropped images belongs, by using a segmentation model trained to detect the target object, and generating M predicted images by merging the M×K crop detection images with each other in a same size as the SEM images, based on position information of the M×K cropped images.

According to a further aspect of the disclosure, there is provided an operating method of a neural network device. The operating method includes obtaining SEM images from an SEM with respect to an analysis target, selecting target images from the SEM images, based on frequencies respectively corresponding to the SEM images, cropping each of the target images into a plurality of cropped images, generating a crop detection image by inferring a target object from each of the plurality of cropped images by using a segmentation model trained to detect the target object in each of the plurality of cropped images, and merging crop detection images with each other in a same size as the SEM images, based on position information of the plurality of cropped images.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, embodiments are described in detail with reference to the accompanying drawings.

Figure 1:
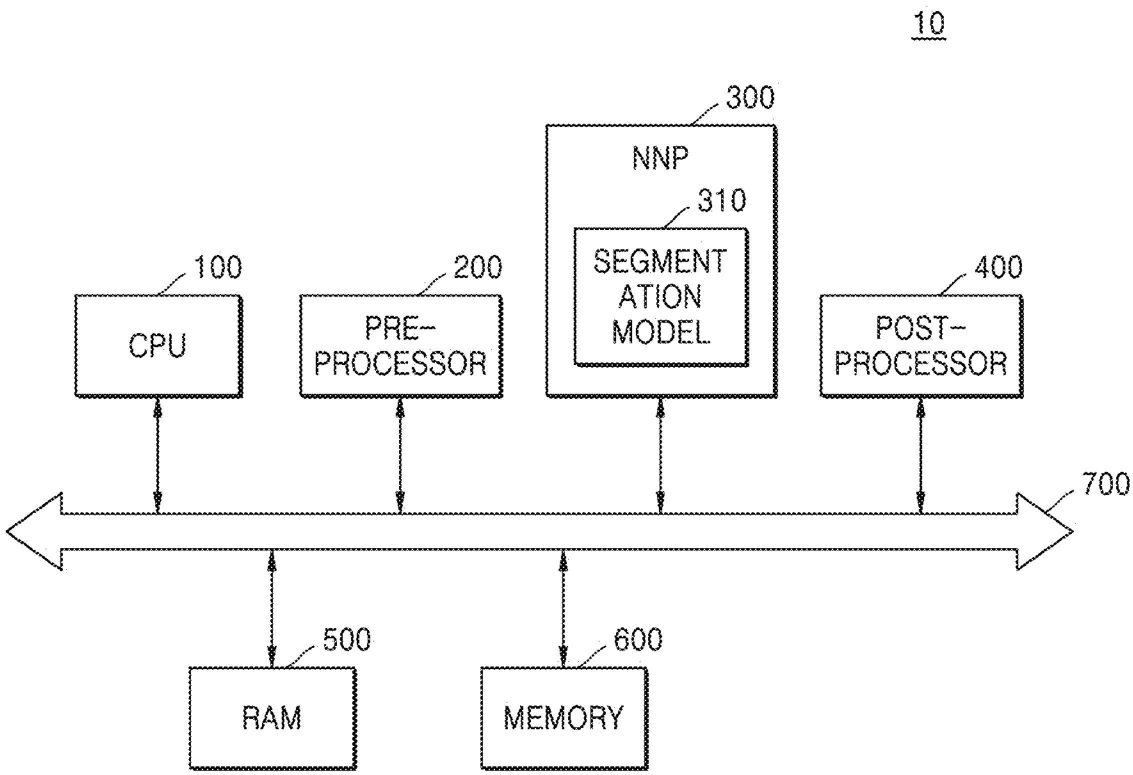
FIG. 1 is a diagram of a neural network device according to an embodiment.

FIG. 1 is a diagram of a neural network device according to an embodiment. A neural network device 10 may analyze input data based on a neural network in real time, extract valid information, and identify a situation based on the valid information or may control elements of an electronic device, on which the neural network device 10 is mounted. For example, the neural network device 10 may be applied to a drone, a robot device, such as an advanced drivers assistance system (ADAS) or the like, a smart television (TV), a smartphone, a medical device, a mobile device, an image display device, measuring equipment, an Internet of things (IoT) device, and so on. The neural network device 10 may be mounted on any other various kinds of electronic devices. For example, the neural network device 10 may correspond to an application processor. An application processor may perform various kinds of calculation processing, and a neural network processor (NNP) included in the application processor may divide calculations by using a segmentation model.

Referring to FIG. 1, the neural network device 10 may include a central processing unit (CPU) 100, a pre-processor 200, an NNP 300, a post-processor 400, random access memory (RAM) 500, and a memory 600. The neural network device 10 may further include an input/output module, a security module, a power controller, or the like and may further include various kinds of arithmetic units. For example, some or all elements of the neural network device 10 may be mounted on a single semiconductor chip. For example, the neural network device 10 may be implemented as a system-on-chip (SoC). The elements of the neural network device 10 may communicate with each other through a bus 700.

The CPU 100 may generally control the operations of the neural network device 10. The CPU 100 may include a single core or multiple cores. The CPU 100 may process or execute programs and/or data, which are stored in the memory 600. For example, the CPU 100 may control the function of the NNP 300 by executing the programs stored in the memory 600.

The pre-processor 200 may select target images from scanning electron microscope (SEM) images. An SEM image may be input to the neural network device 10 and generated by an SEM. The pre-processor 200 may select target images based on frequencies respectively corresponding to SEM images. The pre-processor 200 may convert each of SEM images into a frequency domain and generate a frequency image. The pre-processor 200 may select a target image based on a frequency value corresponding to a frequency image. Target images may refer to SEM images, excluding an out-of-focus image, an image of an area that does not need to be analyzed, an image including a defect, and the like.

The pre-processor 200 may respectively crop target images into cropped images. In an embodiment, the cropped images may be the same size. The pre-processor 200 may crop target images such that adjacent cropped images at least partially overlap with each other.

The NNP 300 may receive input data, perform an operation based on a segmentation model 310, and provide output data based on a result of the operation. The input data of the NNP 300 may include a cropped image, and the output data may include a crop detection image. The NNP 300 may generate or train a neural network, perform an operation based on input data and generate an information signal based on a result of the operation, or retrain the neural network. The NNP 300 may perform calculation processing based on various kinds of neural networks, such as a convolution neural network (CNN), a region with CNN (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, and a classification network. However, embodiments are not limited thereto, and various kinds of calculation processes that simulate the human neural network may be performed.

The NNP 300 may include at least one processor to perform operations of neural network models. The NNP 300 may also include a separate memory storing programs corresponding to neural network models. The NNP 300 may be referred to as a neural network processing device, a neural network integrated circuit, or a neural network processing unit (NPU).

The NNP 300 may receive various kinds of input data from at least one element of the neural network device 10 through the bus 700 and generate output data based on the input data. The NNP 300 may generate output data by performing a neural network operation on input data based on an artificial neural network model, and the neural network operation may include a convolution operation. For this operation, the NNP 300 may train an artificial neural network model, which is described in detail with reference to FIG. 8 below. In an embodiment, the artificial neural network model may include a segmentation model.

According to an embodiment, the NNP 300 of the neural network device 10 may perform an operation using the segmentation model 310. The segmentation model 310 may be trained to detect a target object from a cropped image. The segmentation model 310 may infer an object to which each pixel of an image belongs and prediction with respect to all pixels of the image may be performed. The NNP 300 may infer an object, to which each pixel of a cropped image belongs, by using the segmentation model 310 and may generate a crop detection image. For example, the NNP 300 may generate a crop detection image that infers a first object and a second object from a cropped image by using the segmentation model 310. When a crop detection image is generated by using the segmentation model 310, a target object may be quickly and accurately detected in an analysis target, and analysis efficiency may increase.

The segmentation model 310 may be generated by a learning device (e.g., a server training a neural network based on a large amount of input data) through training and then executed by the NNP 300. However, embodiments are not limited thereto, and the segmentation model 310 may be trained by the NNP 300.

The NNP 300 may train the segmentation model 310. The NNP 300 may perform training based on a training SEM image and a labeled image corresponding to the training SEM image. The NNP 300 may train the segmentation model 310 to output a labeled image from a training SEM image.

The NNP 300 may perform training based on an augmented training image and a labeled image corresponding to the augmented training image. An augmented training image may be generated by transforming a training SEM image by using an augmentation technique. An augmented training image may be generated by an augmentation technique of rotating, flipping, resizing, changing luminance of, adding noise to, and cropping at least one training SEM image. In an embodiment, the NNP 300 may generate an augmented training image. When the NNP 300 generates an augmented training image, data for training the segmentation model 310 may be increased and the performance of the segmentation model 310 may also be increased.

The NNP 300 may train the segmentation model 310 by using skip connection. The NNP 300 may train the segmentation model 310 such that overfitting is prevented. The NNP 300 is described in detail with reference to FIGS. 8 and 9 below.

The NNP 300 may perform transfer learning. The NNP 300 may perform transfer learning and update the segmentation model 310 such that the segmentation model 310 that has been trained may be applied to a cropped image. A training SEM image and an augmented training image, which are used to train the segmentation model 310, may be different from at least one of cropped images, to which the segmentation model 310 is applied. Hereinafter, at least one cropped image different from a training SEM image and an augmented training image is referred to as a new image. For example, a new image may be generated by equipment that is different from equipment generating a training SEM image.

The NNP 300 may have trained the segmentation model 310 with respect to a training SEM image and an augmented training image but not a new image. The NNP 300 may quickly generate the segmentation model 310 applicable to a new image by performing transfer learning based on the new image. In other words, the NNP 300 may perform transfer learning based on a new image and update the segmentation model 310 such that the segmentation model 310 may be applied to the new image. In an embodiment, transfer learning may include multiple learning iterations at multiple layers included in the segmentation model 310. Since transfer learning is performed based on an existing trained segmentation model, weights corresponding to some of multiple layers may saturate after less learning iterations than a total number of learning iterations.

The post-processor 400 may receive a crop detection image from the NNP 300. The post-processor 400 may merge crop detection images with each other. The post-processor 400 may merge crop detection images into an image that is the same size as an SEM image, based on position information of cropped images. Position information of a cropped image may include information about a target image including the cropped image and information about a portion including the cropped image in the target image. In an embodiment, the position information may be stored in the memory 600. The pre-processor may crop a target image and store position information of a cropped image in the memory 600.

The post-processor 400 may remove an overlapping portion from one of two crop detection images and merge the crop detection images. For example, the post-processor 400 may remove, from a first crop detection image, an overlapping portion between the first crop detection image and a second crop detection image adjacent to the first crop detection image and merge the first crop detection image with the second crop detection image. The post-processor 400 may generate a predicted image by merging crop detection images with each other.

The RAM 500 may temporarily store programs, data, or instructions. For example, programs and/or data stored in the memory 600 may be temporarily stored in the RAM 500 according to control by the CPU 100 or boot code. The RAM 500 may include memory, such as dynamic RAM (DRAM) or static RAM (SRAM).

The memory 600 is storage for storing data and may store, for example, an operating system (OS), various programs, and various data. The memory 600 may include at least one selected from volatile memory and non-volatile memory. The non-volatile memory may include read-only memory (ROM), programmable ROM (PROM), electrically programmable ROM (EPROM), electrically erasable programmable ROM (EEPROM), flash memory, phase-change RAM (PRAM), magnetic RAM (MRAM), resistive RAM (RRAM), and ferroelectric RAM (FRAM). The volatile memory may include DRAM, SRAM, synchronous DRAM (SDRAM), PRAM, MRAM, RRAM, and FRAM. In an embodiment, the memory 600 may include at least one selected from the group consisting of a hard disk drive (HDD), a solid state drive (SSD), compact flash (CF) memory, secure digital (SD) memory, micro-SD memory, mini-SD memory, extreme digital (xD) memory, and a memory stick.

The neural network device 10 may select a target image, crop the target image into a cropped image, generate a crop detection image by using a segmentation model, and merge crop detection images with each other, thereby quickly performing image processing of an SEM image. Because an analysis target is analyzed using a predicted image obtained by performing image processing of an SEM image, analysis efficiency may increase.

Figure 2:
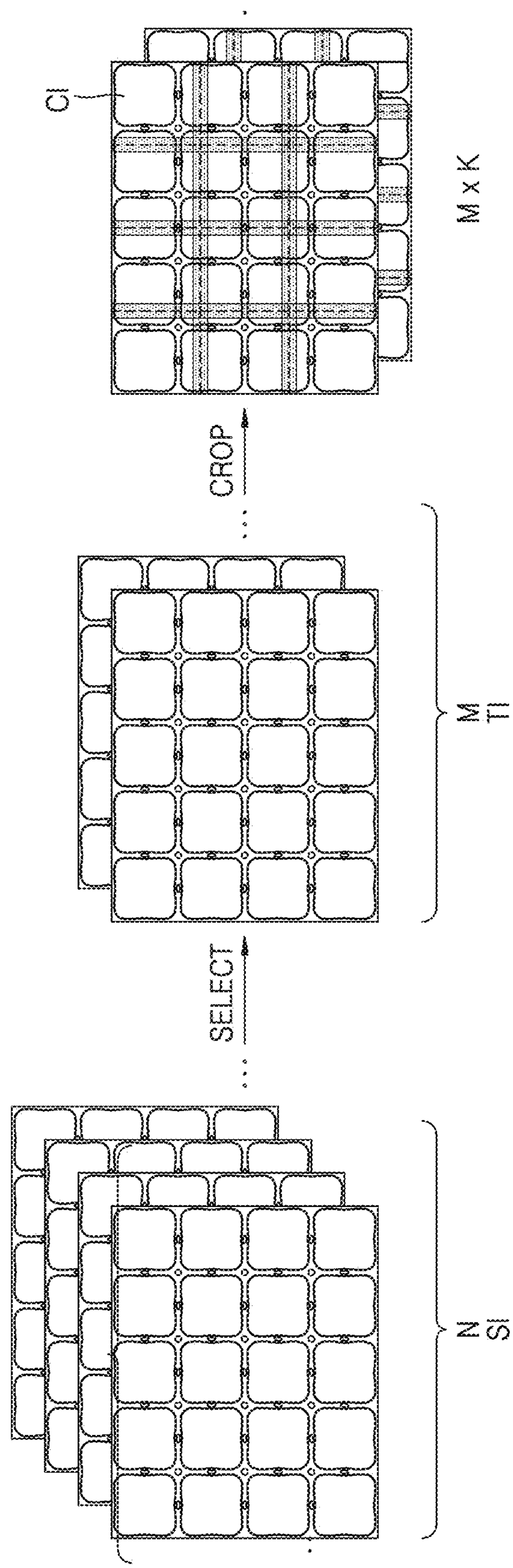
FIG. 2 is a diagram illustrating the operation of a pre-processor, according to an embodiment.

FIG. 2 is a diagram illustrating the operation of a pre-processor, according to an embodiment. In detail, FIG. 2 illustrates the operation of the pre-processor 200 in FIG. 1. Redundant descriptions given above with reference to FIG. 1 are omitted below.

Referring to FIG. 2, the pre-processor may receive a plurality of SEM images SI. An SEM image SI may be generated by an SEM. The SEM may generate an SEM image by detecting electrons emitted from an analysis target.

The pre-processor may receive N SEM images SI. For example, the pre-processor may receive 200 SEM images SI. However, embodiments are not limited thereto. The SEM images SI may be different from each other according to the areas of an analysis target. The SEM may radiate an input electron beam to an area of the analysis target, detect electrons emitted from the area of the analysis target, and generate an SEM image SI. The N SEM images SI may respectively represent different areas of the analysis target. For example, the N SEM images SI may respectively represent different depth areas of the analysis target.

The pre-processor may select a target image TI from the SEM images SI. The pre-processor may select M target images TI from the N SEM images SI. The pre-processor may select a target image TI based on anomaly detection. Anomaly detection may refer to a method of finding data that deviates much from a normal data pattern.

The pre-processor may select a target image TI based on a frequency. The pre-processor may convert an SEM image SI into a frequency domain and generate a frequency image. The pre-processor may select at least a portion of the frequency image. The pre-processor may select a target image TI based on a frequency value of the portion of the frequency image. An SEM image SI corresponding to a frequency value deviating much from the frequency value of the target image TI may not be selected as a target image TI. The target images TI may include an SEM image SI, excluding an out-of-focus image, an image of an area that does not need to be analyzed, and an image including a defect. For example, the pre-processor may select, as the M target images TI, clear images among the N SEM images SI. A process of selecting a target image TI is described in detail with reference to FIG. 3 below.

The pre-processor may crop a target image TI into cropped images CI. The pre-processor may crop each of the M target images TI into K cropped images CI. In an embodiment, M×K cropped images CI may be the same size. The pre-processor may crop each target image TI such that each of the K cropped images CI at least partially overlaps with an adjacent one of the K cropped images CI. A cropped image CI is described in detail with reference to FIG. 6 below.

Figure 3:
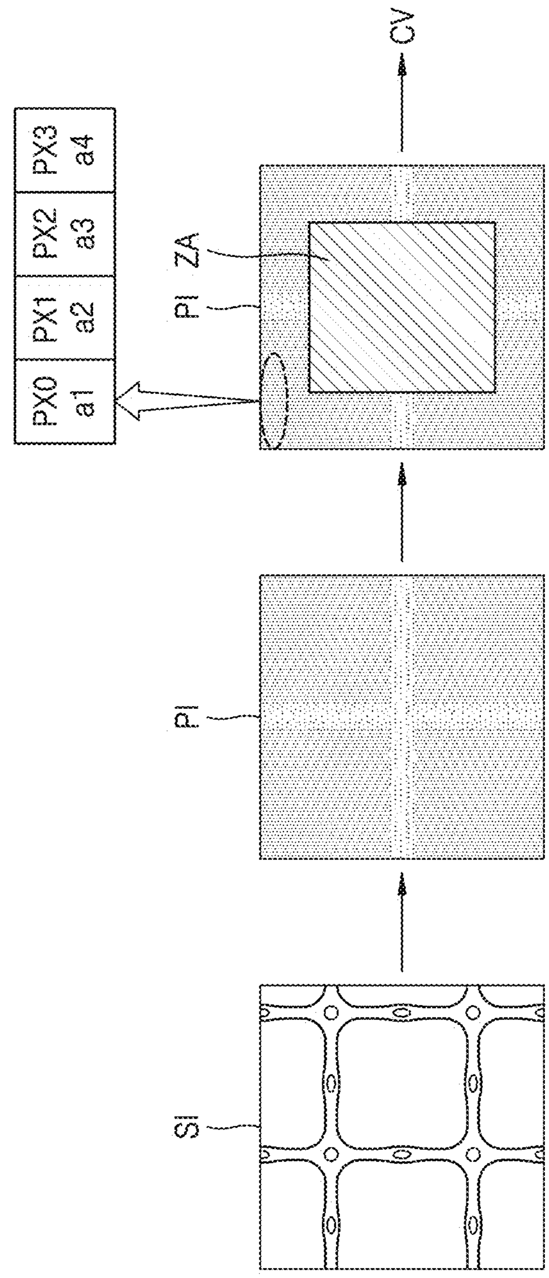
FIG. 3 is a diagram illustrating a process of selecting a target image, according to an embodiment.

FIG. 3 is a diagram illustrating a process of selecting a target image, according to an embodiment. Redundant descriptions given above with reference to FIG. 2 are omitted below.

The pre-processor may convert an SEM image SI into a frequency domain and generate a frequency image PI corresponding to the SEM image SI. For example, the pre-processor may convert the SEM image SI into a frequency domain by using a Fourier transform, but embodiments are not limited thereto. The pre-processor may convert each of the N SEM images SI into a frequency domain and generate N frequency images PI.

The pre-processor may select a target image based on a frequency value of at least a portion of each frequency image PI. In the frequency image PI, a high-frequency domain may have a high frequency value, and a low-frequency domain may have a low frequency value. A target image may have more high-frequency domains than an SEM image SI that is not a target image. In other words, the target image may have a higher frequency value than the SEM image SI that is not a target image. A target image may be selected from SEM images SI based on a frequency value difference between the SEM images SI.

The pre-processor may set, as a zero-padding area ZA, at least a portion of the frequency image PI. The pre-processor may set the zero-padding area ZA in each of the N frequency images PI. In an embodiment, the N frequency images PI may have the same zero-padding area ZA.

The pre-processor may substitute zero for a frequency value corresponding to each of the pixels of the zero-padding area ZA in each frequency image PI. Frequency values respectively corresponding to pixels in an area of the frequency image PI excluding the zero-padding area ZA may remain. A frequency value corresponding to each of the pixels of the zero-padding area ZA of a target image may not be greatly different from that of a non-target image. When a frequency value corresponding to each of the pixels of the zero-padding area ZA is substituted with zero, the difference between the average of frequency values respectively corresponding to the pixels of the other area than the zero-padding area ZA in a target image and the average of frequency values respectively corresponding to the pixels of the other area than the zero-padding area ZA in a non-target image may be maximized. By using this fact, the pre-processor may select a target image.

In an embodiment, the zero-padding area ZA may be set based on the center of the frequency image PI. The zero-padding area ZA may be set around the center of the frequency image PI. The zero-padding area ZA may be set to be in a certain range from the center of the frequency image PI in horizontal and vertical directions. The zero-padding area ZA is quadrangular in FIG. 3 but is not limited thereto and may be set to have various shapes, such as a circle.

The pre-processor may generate a calculation value CV based on frequency values respectively corresponding to the pixels of the other area than the zero-padding area ZA in the frequency image PI. The pre-processor may generate, as the calculation value CV, the average of the frequency values respectively corresponding to the pixels of the other area than the zero-padding area ZA in the frequency image PI. For example, the pre-processor may generate, as the calculation value CV, the average of a frequency value a1 corresponding to a first pixel PX0, a frequency value a2 corresponding to a second pixel PX1, and frequency values respectively corresponding to the other pixels of the frequency image PI except for the zero-padding area ZA.

The pre-processor may select the SEM image SI corresponding to the frequency image PI as a target image when the calculation value CV of the frequency image PI is greater than or equal to a preset threshold value. The pre-processor may select, as a target image, an SEM image SI having the calculation value CV that is greater than or equal to a threshold value. When target images are selected from a plurality of SEM images SI, unnecessary SEM images SI for analysis may be removed, and an analysis target may be accurately analyzed.

Figure 4A:
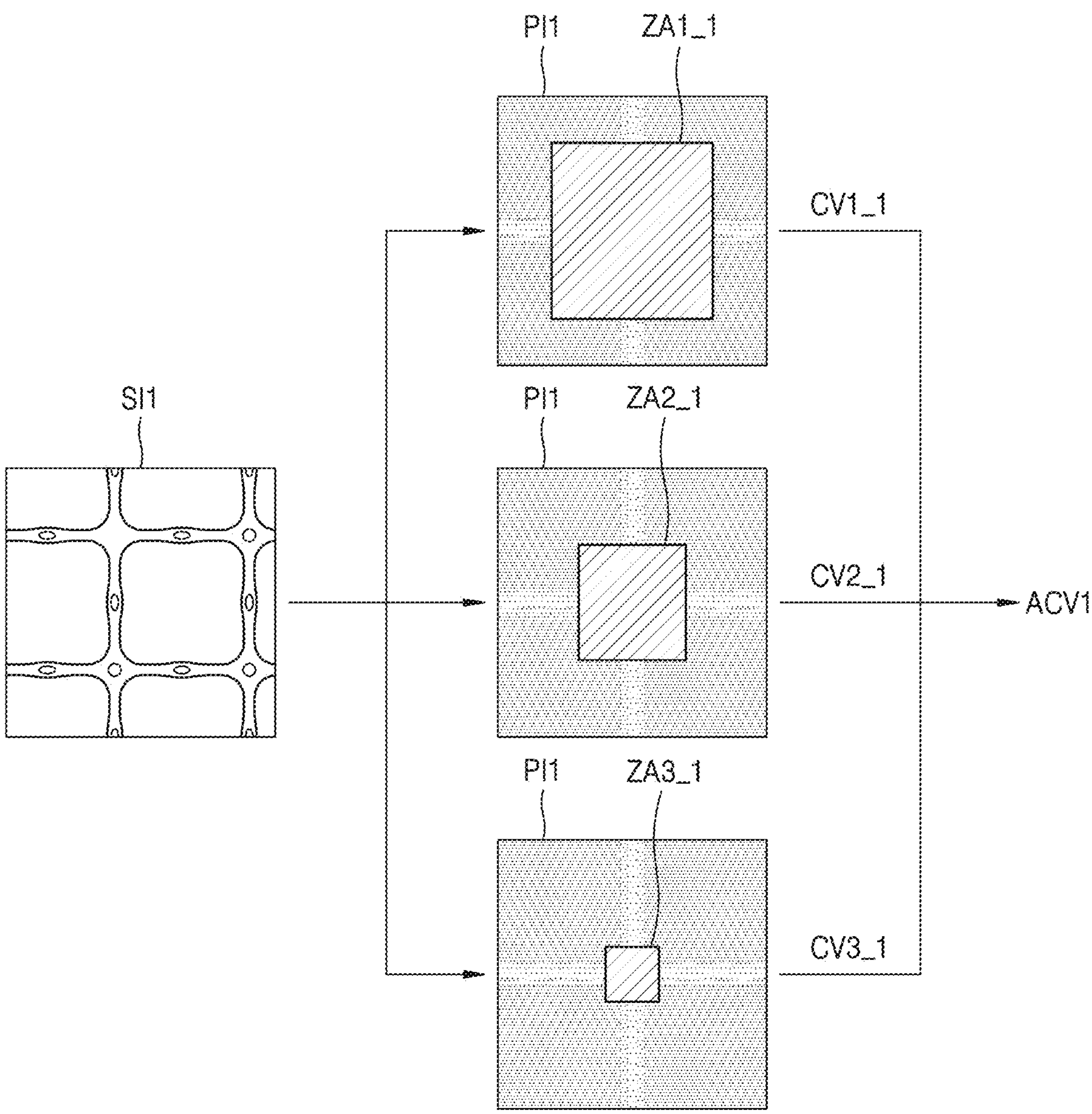
FIG. 4A is a diagram illustrating a plurality of zero-padding areas according to an embodiment.
Figure 4B:
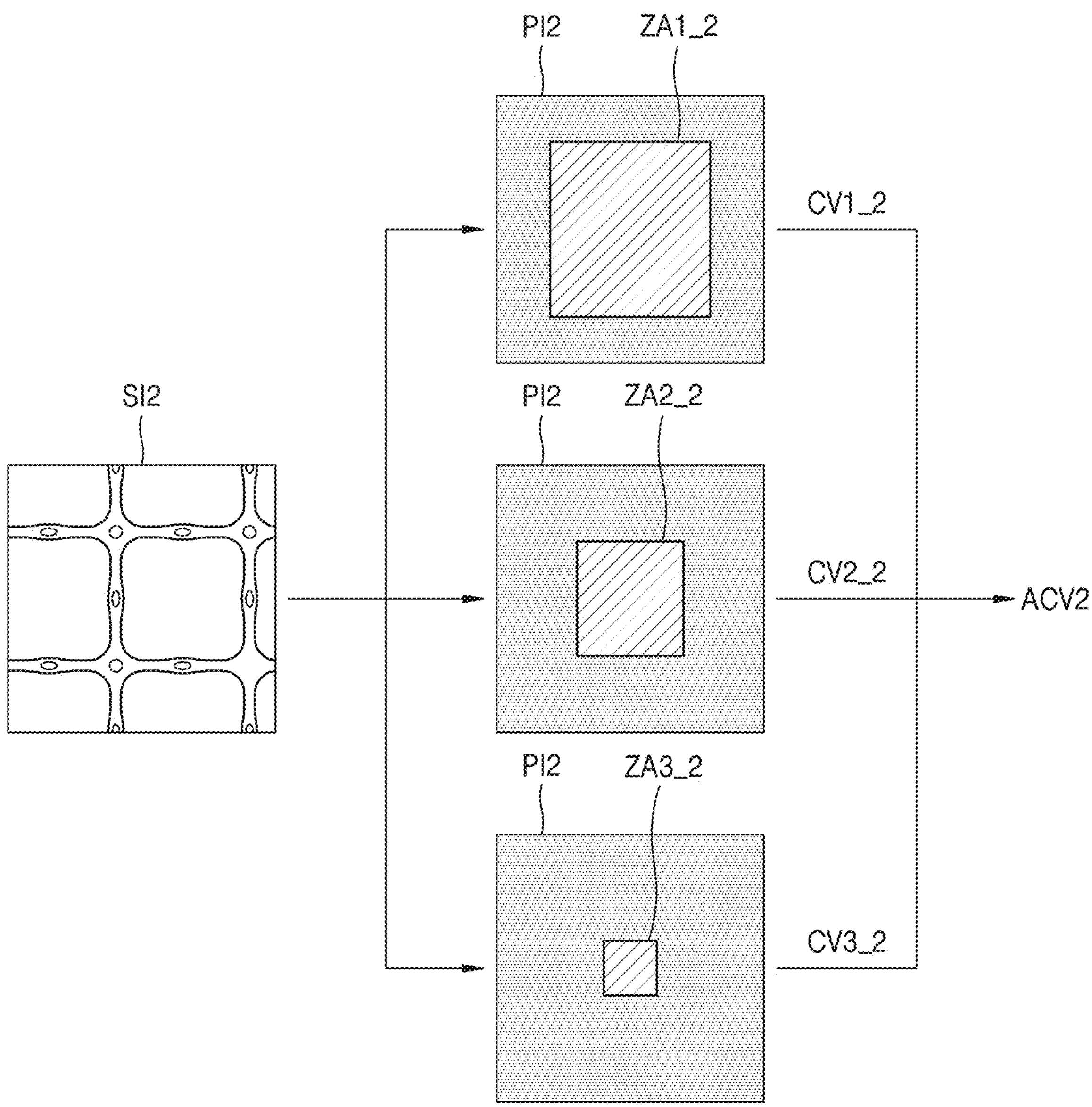
FIG. 4B is a diagram illustrating a plurality of zero-padding areas according to an embodiment.

FIGS. 4A and 4B are diagrams illustrating a plurality of zero-padding areas according to an embodiment. While one zero-padding area ZA is set for one frequency image PI in FIG. 3, a plurality of zero-padding areas, e.g., first to third zero-padding areas ZA1_1, ZA2_1, and ZA3_1, are set for one frequency image, e.g., a first frequency image PI1, in FIG. 4A and a plurality of zero-padding areas, e.g., first to third zero-padding areas ZA1_2, ZA2_2, and ZA3_2, are set for one frequency image, e.g., a second frequency image PI2, in FIG. 4B. Redundant descriptions given above with reference to FIG. 3 are omitted below.

Referring to FIG. 4A, a pre-processor may convert a first SEM image SI1 into a frequency domain and generate the first frequency image PH corresponding to the first SEM image SI1.

The pre-processor may select a target image based on a frequency value of at least a portion of the first frequency image PI1. The pre-processor may set the portion of the first frequency image PI1 as the zero-padding area ZA.

The pre-processor may set the first to third zero-padding areas ZA1_1, ZA2_1, and ZA3_1, which have different sizes from one another, with respect to the first frequency image PI1. The sizes of the first to third zero-padding areas ZA1_1, ZA2_1, and ZA3_1 may be different. The pre-processor may set the first to third zero-padding areas ZA1_1, ZA2_1, and ZA3_1, which have different sizes from one another, with respect to each of N frequency images PI. Although it is illustrated in FIG. 4A that three zero-padding areas, i.e., the first to third zero-padding areas ZA1_1, ZA2_1, and ZA3_1, are set, embodiments are not limited thereto. Two or at least four zero-padding areas may be set with respect to the first frequency image PI1.

The pre-processor may substitute zero for a frequency value corresponding to each of the pixels of each of the first to third zero-padding areas ZA1_1, ZA2_1, and ZA3_1 in the first frequency image PI1. The pre-processor may substitute zero for a frequency value corresponding to each of the pixels of the first zero-padding area ZA1_1. The pre-processor may substitute zero for a frequency value corresponding to each of the pixels of the second zero-padding area ZA2_1. The pre-processor may substitute zero for a frequency value corresponding to each of the pixels of the third zero-padding area ZA3_1.

The pre-processor may generate first to third calculation values CV1_1, CV2_1, and CV3_1 respectively corresponding to the first to third zero-padding areas ZA1_1, ZA2_1, and ZA3_1. The pre-processor may generate the first calculation value CV1_1 based on frequency values respectively corresponding to the pixels of the other area than the first zero-padding area ZA1_1 in the first frequency image PI1. The pre-processor may generate the second calculation value CV2_1 based on frequency values respectively corresponding to the pixels of the other area than the second zero-padding area ZA2_1 in the first frequency image PI1. The pre-processor may generate the third calculation value CV3_1 based on frequency values respectively corresponding to the pixels of the other area than the third zero-padding area ZA3_1 in the first frequency image PI1.

The pre-processor may calculate a first average calculation value ACV1 corresponding to the average of the first to third calculation values CV1_1, CV2_1, and CV3_1 respectively corresponding to the first to third zero-padding areas ZA1_1, ZA2_1, and ZA3_1. The pre-processor may generate the first average calculation value ACV1 by calculating the average of the first to third calculation values CV1_1, CV2_1, and CV3_1.

Referring to FIGS. 4A and 4B, the pre-processor may convert a second SEM image SI2 into a frequency domain and generate the second frequency image PI2 corresponding to the second SEM image SI2.

The pre-processor may set the first to third zero-padding areas ZA1_2, ZA2_2, and ZA3_2, which have different sizes from one another, with respect to the second frequency image PI2. The sizes of the first to third zero-padding areas ZA1_2, ZA2_2, and ZA3_2 may be different. The size of the first zero-padding area ZA1_1 may be the same as the size of the first zero-padding area ZA1_2. The size of the second zero-padding area ZA2_1 may be the same as the size of the second zero-padding area ZA2_2. The size of the third zero-padding area ZA3_1 may be the same as the size of the third zero-padding area ZA3_2.

The pre-processor may substitute zero for a frequency value corresponding to each of the pixels of each of the first to third zero-padding areas ZA1_2, ZA2_2, and ZA3_2 in the second frequency image PI2.

The pre-processor may generate first to third calculation values CV1_2, CV2_2, and CV3_2 respectively corresponding to the first to third zero-padding areas ZA1_2, ZA2_2, and ZA3_2. The pre-processor may generate the first calculation value CV1_2 based on frequency values respectively corresponding to the pixels of the other area than the first zero-padding area ZA1_2 in the second frequency image PI2. The pre-processor may generate the second calculation value CV2_2 based on frequency values respectively corresponding to the pixels of the other area than the second zero-padding area ZA2_2 in the second frequency image PI2. The pre-processor may generate the third calculation value CV3_2 based on frequency values respectively corresponding to the pixels of the other area than the third zero-padding area ZA3_2 in the second frequency image PI2. For example, the first to third calculation values CV1_2, CV2_2, and CV3_2 may be respectively less than the first to third calculation values CV1_1, CV2_1, and CV3_1.

The pre-processor may calculate a second average calculation value ACV2 corresponding to the average of the first to third calculation values CV1_2, CV2_2, and CV3_2. The pre-processor may generate the second average calculation value ACV2 by calculating the average the first to third calculation values CV1_2, CV2_2, and CV3_2. For example, the second average calculation value ACV2 may be less than the first average calculation value ACV1.

Figure 5:
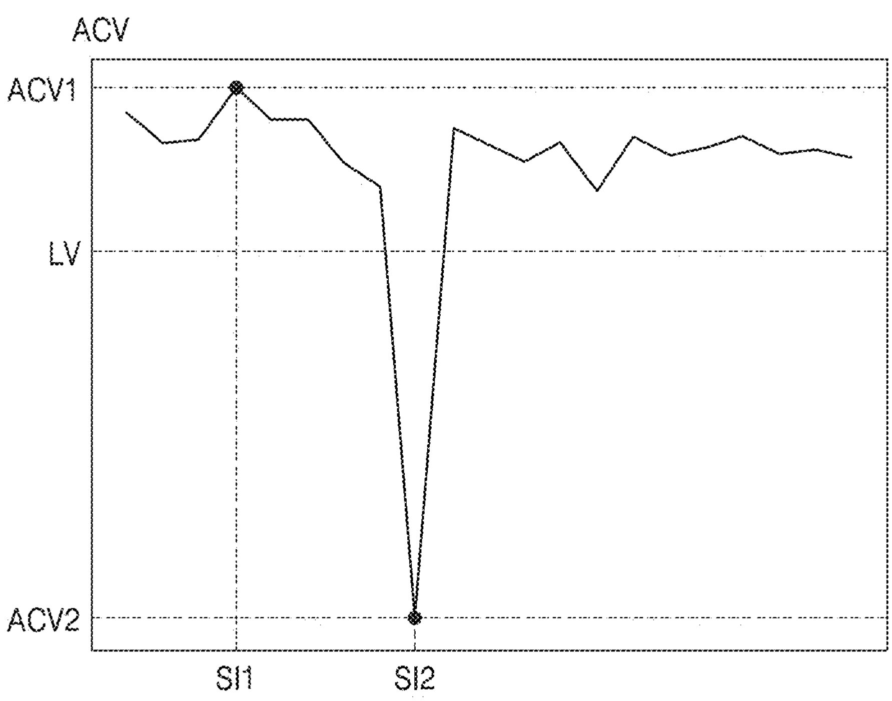
FIG. 5 is a graph illustrating a target image according to an embodiment.

FIG. 5 is a graph illustrating a target image according to an embodiment. Because the first SEM image SI1 in FIG. 5 corresponds to the first SEM image SI1 in FIG. 4A and the second SEM image SI2 in FIG. 5 corresponds to the second SEM image SI2 in FIG. 4B, redundant descriptions thereof are omitted below. Referring to FIG. 5, the horizontal axis of the graph of FIG. 5 may be an SEM image, and the vertical axis thereof may be an average calculation value.

A pre-processor may select a target image based on a threshold value LV. The threshold value LV may be preset. The pre-processor may select, as a target image, an SEM image having an average calculation value that is greater than or equal to the threshold value LV. The pre-processor may select the first SEM image SI1 as a target image because the first average calculation value ACV1 of the first SEM image SI1 is greater than the threshold value LV. The pre-processor may not select the second SEM image SI2 as a target image because the second average calculation value ACV2 of the second SEM image SI2 is less than the threshold value LV.

Figure 6:
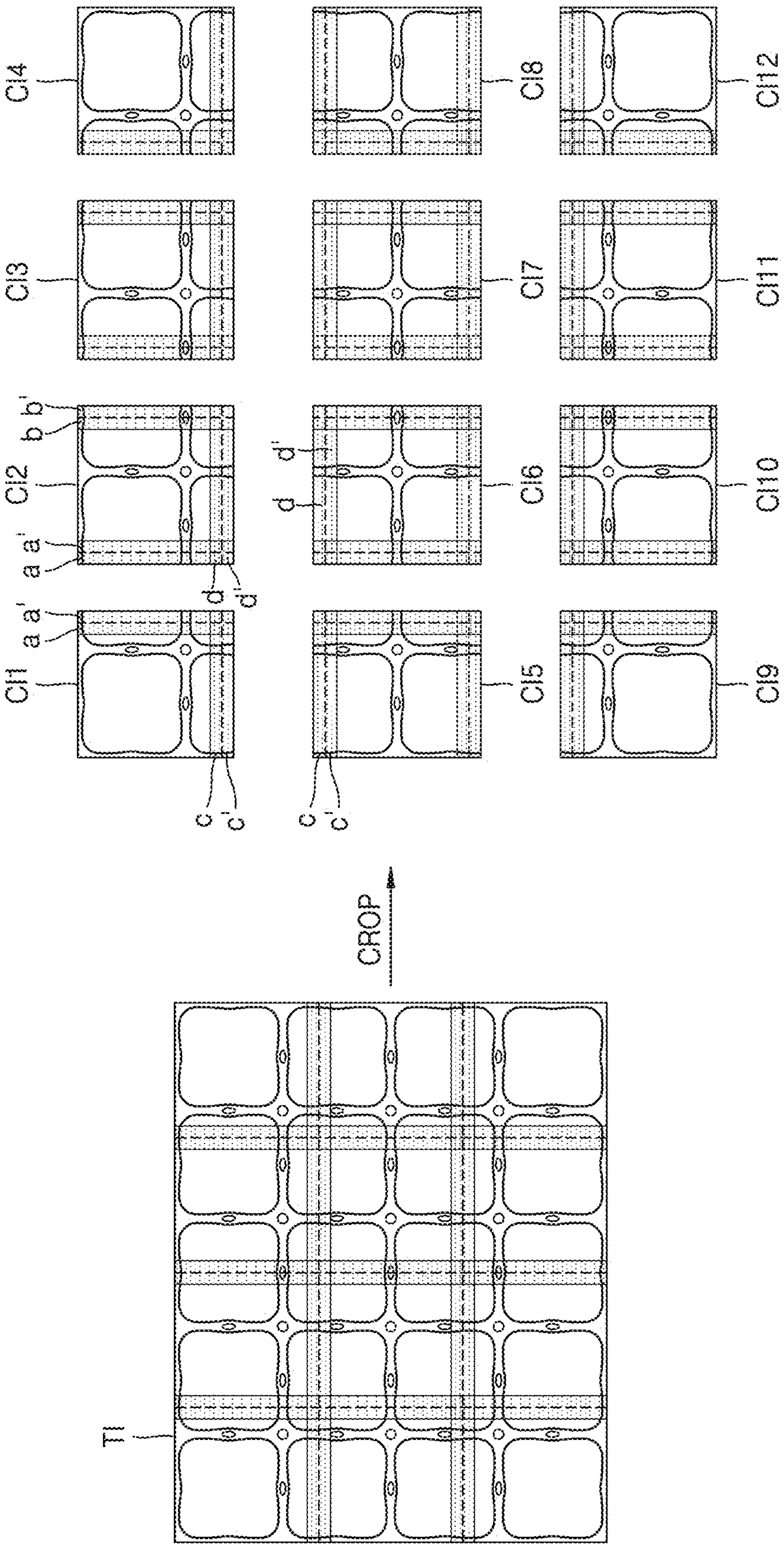
FIG. 6 is a diagram illustrating cropped images according to an embodiment.

FIG. 6 is a diagram illustrating cropped images according to an embodiment.

Referring to FIG. 6, a pre-processor may crop a target image TI into first to twelfth cropped images CI1 to CI12. Although the target image TI is cropped into twelve cropped images, i.e., the first to twelfth cropped images CI1 to CI12, in FIG. 6, embodiments are not limited thereto. The target image TI may be cropped into various numbers of cropped images.

The target image TI may be cropped into the first to twelfth cropped images CI1 to CI12. In an embodiment, the first to twelfth cropped images CI1 to CI12 may be the same size. For example, the size of the first cropped image CI1 may be the same as the size of the second cropped image CI2.

The first cropped image CI1 may be adjacent to the second cropped image CI2. The first cropped image CI1 may also be adjacent to the fifth cropped image CI5. The second cropped image CI2 may be adjacent to the first, third, and sixth cropped images CI1, CI3, and CI6. The third cropped image CI3 may be adjacent to the second, fourth, and seventh cropped images CI2, CI4, and CI7.

A pre-processor (e.g., the pre-processor 200 in FIG. 1) may crop the target image TI into a plurality of cropped images such that adjacent cropped images at least partially overlap with each other. The pre-processor may crop the target image TI such that a portion of the first cropped image CI1 overlaps with a portion of the second cropped image CI2. For example, the pre-processor may crop the target image TI such that areas "a" and a' of the first cropped image CI1 respectively overlap with areas "a" and a' of the second cropped image CI2.

The pre-processor may crop the target image TI such that a portion of the first cropped image CI1 overlaps with a portion of the fifth cropped image CI5. For example, the pre-processor may crop the target image TI such that areas "a" and a' of the first cropped image CI1 respectively overlap with areas "a" and a' of the second cropped image CI2 and areas "c" and c' of the first cropped image CI1 respectively overlap with areas "c" and c' of the fifth cropped image CI5. The pre-processor may crop the target image TI such that a portion of the second cropped image CI2 overlaps with a portion of the third cropped image CI3.

The pre-processor may crop the target image TI such that portions of the second cropped image CI2 respectively overlap with a portion of the first cropped image CI1 and a portion of the sixth cropped image CI6. For example, the pre-processor may crop the target image TI such that areas "b" and b' of the second cropped image CI2 respectively overlap with areas "b" and b' of the third cropped image CI3. The pre-processor may crop the target image TI such that the areas "a" and a' of the second cropped image CI2 respectively overlap with the areas "a" and a' of the first cropped image CI1 and areas "d" and d' of the second cropped image CI2 respectively overlap with areas "d" and d' of the sixth cropped image CI6.

The pre-processor may crop a target image and store position information of each cropped image in a memory (e.g., the memory 600 in FIG. 1). The position information may include information about the target image TI, to which each of the first to twelfth cropped images CI1 to CI12 belongs, and information about a portion of the target image TI, to which each cropped image belongs. For example, the position information of the first cropped image CI1 may include information about the target image TI, to which the first cropped image CI1 belongs, and information indicating that the first cropped image CI1 is in the top left corner of the target image TI.

When the pre-processor crops the target image TI, a memory (e.g., the memory 600 in FIG. 1) of a neural network device (e.g., the neural network device 10 of FIG. 1) may be efficiently used. When a pre-processor crops the target image TI such that adjacent cropped images at least partially overlap with each other, consistency of the edges of the cropped images may increase. When a neural network device performs image processing of a cropped image, the clarity of a boundary of a non-overlapping portion of the cropped image may increase.

Figure 7:
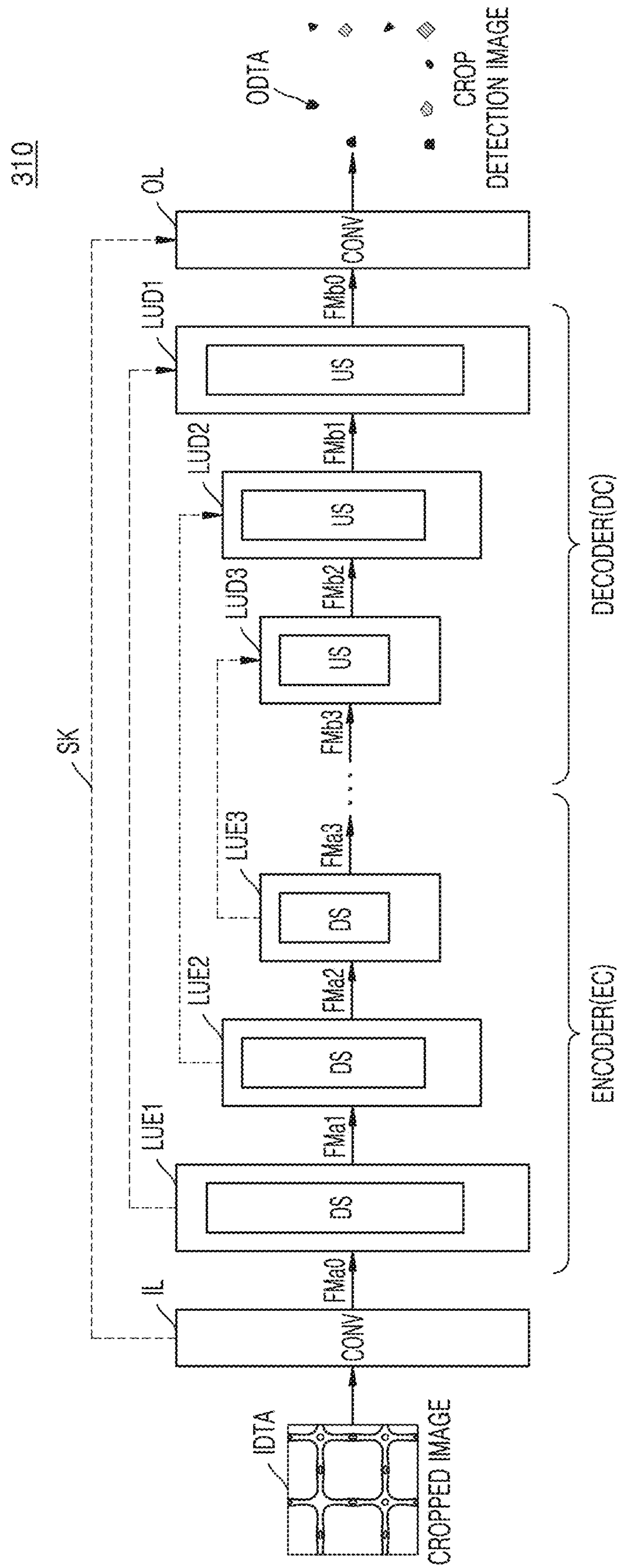
FIG. 7 is a diagram illustrating a segmentation model according to an embodiment.

FIG. 7 is a diagram illustrating a segmentation model according to an embodiment. A segmentation model 310 of FIG. 7 corresponds to the segmentation model in FIG. 1, and therefore, redundant descriptions thereof are omitted.

The segmentation model 310 may include an artificial neural network model. The artificial neural network model may have a feedback structure, in which a previous output is applied as a current input. The artificial neural network model may have a deep neural network as a backbone architecture. For example, the segmentation model 310 may be based on U-Net++. U-Net++ may include an end-to-end fully convolutional network. U-Net++ may include convolution layers, bilinear upsampling layers, average layers, and attention layers.

According to an embodiment, the segmentation model 310 may be trained to detect a target object in a cropped image. The segmentation model 310 may infer and output an object, to which each pixel of an image belongs, and prediction with respect to all pixels of the image may be performed. The segmentation model 310 may be trained to infer an object, to which each pixel of a cropped image belongs, and generate a crop detection image. The learning of the segmentation model 310 is described in detail with reference to FIG. 8 below.

Referring to FIG. 7, the segmentation model 310 may infer two target objects in a cropped image. The segmentation model 310 may infer to which of first and second objects each pixel of the cropped image belongs. The segmentation model 310 may generate a crop detection image, in which a pixel belonging to the first object is marked blue and a pixel belonging to the second object is marked red. Although two target objects are displayed in FIG. 7, embodiments are not limited thereto. The segmentation model 310 may be trained to infer various numbers of target objects. A target object may refer to an object or a portion to be analyzed in an analysis target.

Referring to FIG. 7, the segmentation model 310 may include an input layer IL, an output layer OL, an encoder EC, and a decoder DC. In an embodiment, the segmentation model 310 may have an autoencoder architecture. The segmentation model 310 may receive input data IDTA and may calculate feature values of the input data IDTA by using the input layer IL, the encoder EC, the decoder DC, and the output layer OL. For example, the segmentation model 310 may receive a cropped image and perform an operation to convert the cropped image into a crop detection image.

The segmentation model 310 may include a plurality of layer units. The layer units may include a plurality of layers, and each layer (e.g., a convolution layer) may perform an operation (e.g., a convolution operation) allocated thereto. Each of the encoder EC and the decoder DC may include a plurality of layer units. However, this is just an example, and embodiments are not limited thereto. The encoder EC may include a plurality of encoding layer units, e.g., first to third encoding layer units LUE1, LUE2, and LUE3, and the decoder DC may include a plurality of decoding layer units, e.g., first to third decoding layer units LUD1, LUD2, and LUD3.

Referring to FIG. 7, each of the first to third decoding layer units LUD1, LUD2, and LUD3 may receive data encoded by its corresponding one among the first to third encoding layer units LUE1, LUE2, and LUE3. For example, encoded data may include a feature map. The input layer IL may output a feature map FMa0 to the first encoding layer unit LUE1. For example, the input layer IL may include a convolution layer. The input layer IL may perform a convolution operation on the input data IDTA and a weight map. The weight map may traverse the input data IDTA and perform a convolution operation using a certain stride value.

The encoder EC may receive a feature map from a previous layer and perform an operation allocated to each of the first to third encoding layer units LUE1, LUE2, and LUE3. For example, the first encoding layer unit LUE1 may receive the feature map FMa0 and perform operations of various layers included therein. For example, the first encoding layer unit LUE1 may include a convolution layer, a sampling layer, and an activation layer. However, layers included in an encoding layer unit are not necessarily limited to those described above. The convolution layer may perform a convolution operation. The sampling layer may perform down-sampling, up-sampling, average pooling, or maximum pooling. The activation layer may perform an operation using a rectified linear unit (ReLU) function or a sigmoid function. The first encoding layer unit LUE1 may output a feature map FMa1 based on a result of the operations.

In an embodiment, the first encoding layer unit LUE1 may include a down-sampling layer DS. The down-sampling layer DS may select certain feature values from feature values included in the feature map FMa0 and output the certain feature values as the feature values of the feature map FMa1. In other words, the down-sampling layer DS may control the width and height of the feature map FMa1. For example, the feature map FMa1 output from the first encoding layer unit LUE1 may have less width and height and a greater depth than the feature map FMa0 input to the first encoding layer unit LUE1.

The second and third encoding layer units LUE2 and LUE3 may perform operations in a similar manner to the first encoding layer unit LUE1. In other words, each of the second and third encoding layer units LUE2 and LUE3 may receive a feature map from a previous encoding layer unit, perform operations of a plurality of layers included therein, and output a feature map including a result of the operations to a subsequent encoding layer unit.

The decoder DC may receive a feature map from a previous layer and perform an operation allocated to each of the first to third decoding layer units LUD1, LUD2, and LUD3. For example, the third decoding layer unit LUD3 may receive a feature map FMb3 and perform operations of various layers included therein. For example, the third decoding layer unit LUD3 may include a convolution layer, a sampling layer, and an activation layer. However, layers included in a decoding layer unit are not necessarily limited to those described above. The third decoding layer unit LUD3 may output a feature map FMb2 based on a result of the operations.

In an embodiment, the third decoding layer unit LUD3 may include an up-sampling layer US. The up-sampling layer US may perform up-sampling using each feature value of an input feature map and feature values adjacent to each feature value. For example, the up-sampling layer US may write the same feature values to an output feature map by using a nearest neighbor method. Alternatively, the up-sampling layer US may include a transpose convolution layer and may perform up-sampling of an image by using a certain weight map. However, embodiments are not necessarily limited thereto.

The second and first decoding layer units LUD2 and LUD1 may perform operations in a similar manner to the third decoding layer unit LUD3. In other words, each of the second and first decoding layer units LUD2 and LUD1 may receive a feature map from a previous decoding layer unit, perform operations of a plurality of layers included therein, and output a feature map including a result of the operations to a subsequent decoding layer unit.

The output layer OL may reconstruct output data ODTA from a feature map FMb0 output from the first decoding layer unit LUD1. The output layer OL may include a reconstruction layer, which converts a feature map into image data. For example, the output layer OL may be a convolution layer, a deconvolution layer, and a transpose convolution layer. For example, image data may correspond to a crop detection image. A crop detection image may be output in the same size as a cropped image.

In an embodiment, the segmentation model 310 may include a skip connection SK. The skip connection SK may refer to direct propagation from one layer to another layer by skipping one or more layers in between. For example, the input layer IL may directly propagate data to the output layer OL. The feature map FMa0 output from the input layer IL may be output to the output layer OL and the first encoding layer unit LUE1.

Figure 8:
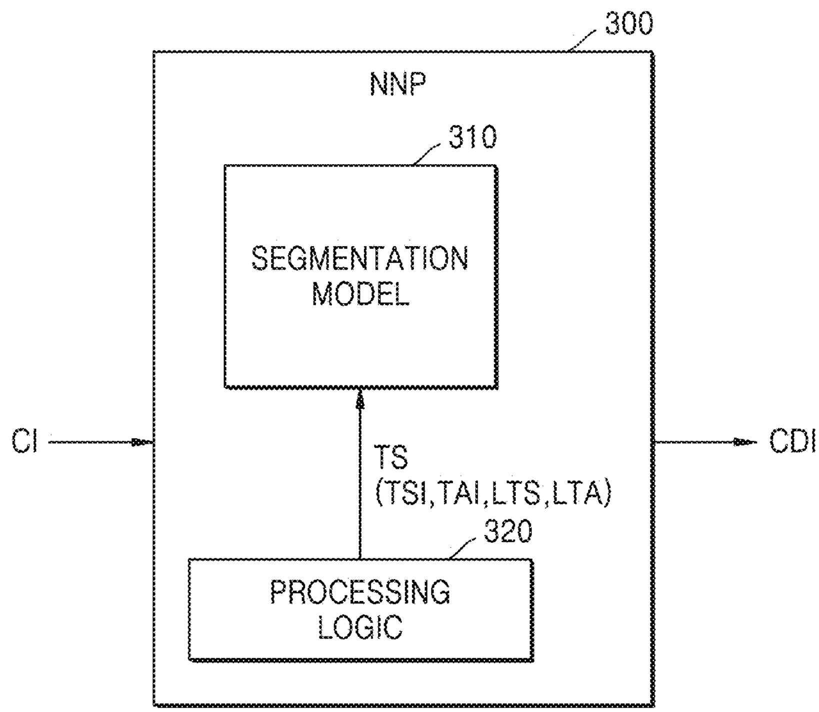
FIG. 8 is a diagram illustrating learning of a segmentation model, according to an embodiment.

FIG. 8 is a diagram illustrating learning of a segmentation model, according to an embodiment. FIG. 8 illustrates learning of the segmentation model 310 of FIG. 7. Redundant descriptions given above with reference to FIG. 7 are omitted below.

Referring to FIG. 8, the NNP 300 may include the segmentation model 310 and a processing logic 320. The processing logic 320 may load the segmentation model 310, perform calculation processing based on a cropped image CI, and output a crop detection image CDI according to a result of the calculation processing. The processing logic 320 may train the segmentation model 310 to output the crop detection image CDI from the cropped image CI.

The processing logic 320 may train the segmentation model 310. The processing logic 320 may train the segmentation model 310 based on a training set TS. The training set TS may include a training SEM image TSI, a labeled image LTS corresponding to the training SEM image TSI, an augmented training image TAI, and a labeled image LTA corresponding to the augmented training image TAI.

The training set TS may refer to a data set for training the segmentation model 310 to generate the crop detection image CDI from the cropped image CI. The training SEM image TSI and the augmented training image TAI may be similar in form to the cropped image CI, and the labeled image LTS and the labeled image LTA may be similar in form to the crop detection image CDI. The training SEM image TSI, the labeled image LTS, the augmented training image TAI, and the labeled image LTA may be the same size as the cropped image CI when used for training. The training set TS may be stored in a memory (e.g., the memory 600 in FIG. 1) or transmitted to the processing logic 320 from the outside of the neural network device 10.

The processing logic 320 may train the segmentation model 310 to output the labeled image LTS from the training SEM image TSI. The processing logic 320 may train the segmentation model 310 to output the labeled image LTS resulting from inferring a target object from the training SEM image TSI. In detail, the processing logic 320 may train a parameter of the segmentation model 310 to generate the labeled image LTS from the training SEM image TSI. For example, the parameter of the segmentation model 310 may refer to a weight used to calculate a feature map. The processing logic 320 may input the training SEM image TSI and the labeled image LTS to the segmentation model 310 and update a weight such that the labeled image LTS corresponding to the training SEM image TSI is output. A weight may be modified each time when the segmentation model 310 is trained based on the training set TS.

The processing logic 320 may perform training based on the augmented training image TAI and the labeled image LTA corresponding to the augmented training image TAI. The processing logic 320 may generate the augmented training image TAI by transforming the training SEM image TSI based on an augmentation technique. The augmented training image TAI may be generated by an augmentation technique of rotating, flipping, resizing, changing luminance of, adding noise to, and cropping at least one training SEM image TSI. When the NNP 300 generates an augmented training image, data for training the segmentation model 310 may be increased and the performance of the segmentation model 310 may also be increased.

Rotation may refer to image processing by which the training SEM image TSI is rotated by a certain angle. For example, the processing logic 320 may generate the augmented training image TAI by rotating the training SEM image TSI by 5 degrees clockwise. Flipping may refer to image processing by which the training SEM image TSI is flipped vertically or horizontally. For example, the processing logic 320 may generate the augmented training image TAI by flipping the training SEM image TSI horizontally. Resizing may refer to image processing by which the size of the training SEM image TSI is increased or decreased. Cropping may refer to image processing by which the training SEM image TSI is cropped. Adding noise may refer to image processing by which Gaussian noise is added to the training SEM image TSI. Changing luminance may refer to image processing by which the luminance of the training SEM image TSI is increased or decreased.

The processing logic 320 may train the segmentation model 310 to output the labeled image LTA resulting from inferring a target object from the augmented training image TAI. In detail, the processing logic 320 may train a parameter of the segmentation model 310 to generate the labeled image LTA from the augmented training image TAI. The processing logic 320 may input the augmented training image TAI and the labeled image LTA to the segmentation model 310 and update a weight such that the labeled image LTA corresponding to the augmented training image TAI is output.

The NNP 300 may train the segmentation model 310 by using a skip connection. A skip connection may be referred to as a residual connection. A skip connection may refer to direct propagation of data from a first layer to a second layer by skipping data propagation to layers between the first and second layers in a neural network. In an embodiment, the processing logic 320 may train the segmentation model 310 by using a skip connection. For example, when training the segmentation model 310, the processing logic 320 may directly propagate data from an input layer of the segmentation model 310 to an output layer of the segmentation model 310. When the segmentation model 310 is trained using a skip connection, data loss with respect to an initial layer of the segmentation model 310 may be prevented, and the segmentation model 310 may perform accurate prediction.

The NNP 300 may train the segmentation model 310 such that overfitting is prevented. Overfitting may refer to the case where the segmentation model 310 operates normally with respect to the training set TS but does not operate properly with respect to a cropped image. When the segmentation model 310 is overfitted, the labeled image LTS and the labeled image LTA may be respectively output with respect to the training SEM image TSI and the augmented training image TAI, but the crop detection image CDI may not be output with respect to the cropped image CI. For example, the processing logic 320 may train the segmentation model 310 based on L2 regulation to prevent overfitting.

The processing logic 320 may perform transfer learning. Transfer learning is described with reference to FIG. 9 below.

Figure 9:
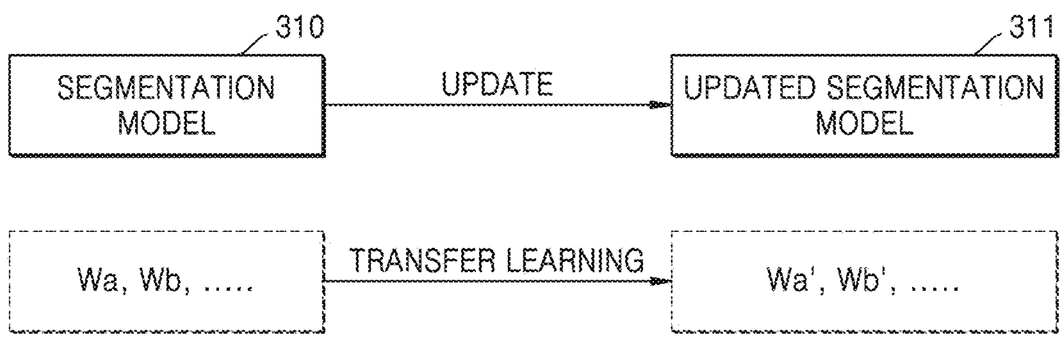
FIG. 9 is a diagram illustrating transfer learning according to an embodiment.

FIG. 9 is a diagram illustrating transfer learning according to an embodiment. An NNP (e.g., the NNP 300 of FIG. 8) may perform transfer learning. In detail, a processing logic (e.g., the processing logic 320 in FIG. 8) may perform transfer learning.

Referring to FIGS. 8 and 9, the training SEM image TSI and the augmented training image TAI, which are used to train the segmentation model 310, may be different from at least one of cropped images CI to which the segmentation model 310 is applied. Hereinafter, the cropped image CI that is different from the training SEM image TSI and the augmented training image TAI is referred to as a new image. For example, a new image may be generated by other equipment than equipment generating the training SEM image TSI. Because the segmentation model 310 is not trained with respect to the new image, the segmentation model 310 may not accurately detect a target object in the new image. It may take a long time to train the segmentation model 310 to be also applied to the new image.

According to an embodiment, the processing logic 320 may perform transfer learning. The processing logic 320 may quickly generate the segmentation model 310, which is also applied to the new image, by performing transfer learning based on the new image. In other words, when the processing logic 320 performs transfer learning, the segmentation model 310 may be updated to be also applied to the new image. In detail, the processing logic 320 may update a parameter of the segmentation model 310 such that the segmentation model 310 generates, from the new image, a crop detection image corresponding to the new image. In an embodiment, transfer learning may include learning of a plurality of layers included in the segmentation model 310. Because transfer learning is performed based on an existing trained model, weights corresponding to some of the layers may saturate even after less learning iterations than a total number of learning iterations.

Transfer learning may train an updated segmentation model 311 by using neural network algorithms or weights, which are applied to the segmentation model 310. The segmentation model 310 may be updated through transfer learning, and the updated segmentation model 311 may be generated.

A process of obtaining weights Wa' and Wb' applied to the updated segmentation model 311 by using weights Wa and Wb learned according to the segmentation model 310 may be referred to as transfer learning. In other words, transfer learning may refer to a process of obtaining the weights Wa' and Wb', to which the weights Wa and Wb applied to the segmentation model 310 are updated, by performing multiple learning iterations of multiple layers using the weights Wa and Wb that have already been learned as initial weights. For example, when there are the weights Wa and Wb according to the segmentation model 310 trained based on the training set TS, the segmentation model 310 may be updated using the weights Wa and Wb such that a target object is inferred from a new image.

Figure 10:
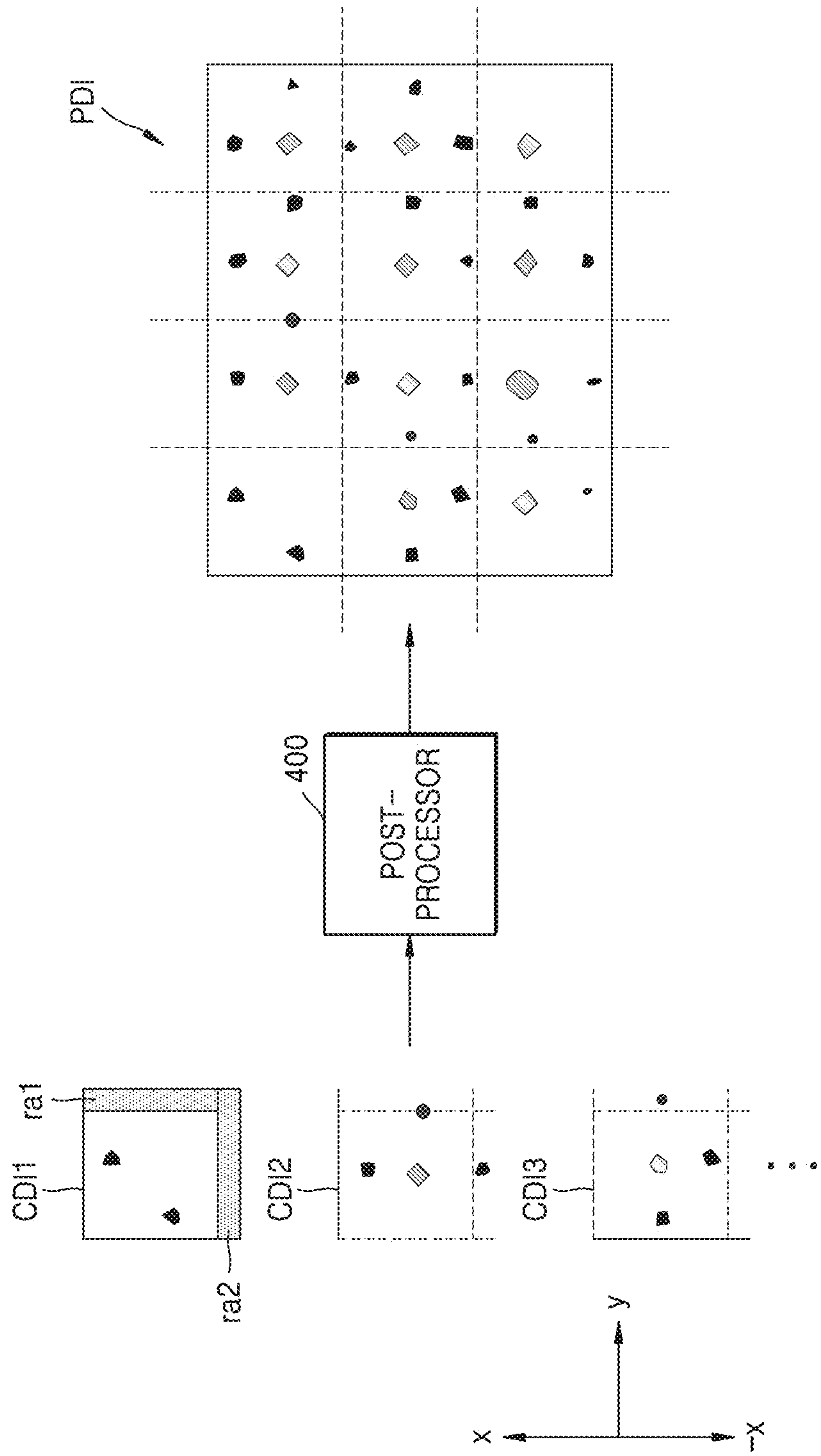
FIG. 10 is a diagram illustrating a method of merging crop detection images with each other, according to an embodiment.

FIG. 10 is a diagram illustrating a method of merging crop detection images with each other, according to an embodiment.

Referring to FIG. 10, the post-processor 400 may receive first to third crop detection images CDI1, CDI2, and CDI3 from an NNP (e.g., the NNP 300 in FIG. 1). The post-processor 400 may merge the first to third crop detection images CDI1, CDI2, and CDI3 with one another. The post-processor 400 may merge the first to third crop detection images CDI1, CDI2, and CDI3 based on position information of cropped images. The post-processor 400 may merge the first to third crop detection images CDI1, CDI2, and CDI3 based on position information of cropped images respectively corresponding to the first to third crop detection images CDI1, CDI2, and CDI3. The position information may include information about a target image including each of the cropped images respectively corresponding to the first to third crop detection images CDI1, CDI2, and CDI3 and information about a portion including each cropped image in the target image.

In an embodiment, the post-processor 400 may receive the position information from the memory 600. The post-processor 400 may merge the first and second crop detection images CDI1 and CDI2 with each other based on the position information such that the second crop detection image CD2 is adjacent to the first crop detection image CD1 in a y-axis direction. The post-processor 400 may merge the first and third crop detection images CDI1 and CDI3 with each other based on the position information such that the third crop detection image CD3 is adjacent to the first crop detection image CD1 in a −x-axis direction.

The post-processor 400 may remove removal areas, i.e., overlapping portions among the first to third crop detection images CDI1, CDI2, and CDI3, and merge the first to third crop detection images CDI1, CDI2, and CDI3 with one another. For example, the post-processor 400 may remove, from the first crop detection image CD1, a removal area ra1 overlapping with the second crop detection image CDI2 and then merge the first and second crop detection images CDI1 and CDI2 with each other. The removal area ra1 may correspond to the area a' of the first cropped image CI1 in FIG. 6. The post-processor 400 may remove, from the first crop detection image CD1, a removal area ra2 overlapping with the third crop detection image CDI3 and then merge the first and third crop detection images CDI1 and CDI3 with each other. The removal area ra2 may correspond to the area c' of the first cropped image CI1 in FIG. 6.

The post-processor 400 may generate a predicted image PDI by merging the first to third crop detection images CDI1, CDI2, and CDI3. The predicted image PDI may be the same size as the target image. When the target image is cropped into K cropped images, the post-processor 400 may generate the predicted image PDI by merging K crop detection images. When each of M target images is cropped into K cropped images, the post-processor 400 may generate M predicted images PDI by performing merging of M×K crop detection images. Analysis may be performed on an analysis target based on a predicted image PDI.

Figure 11:
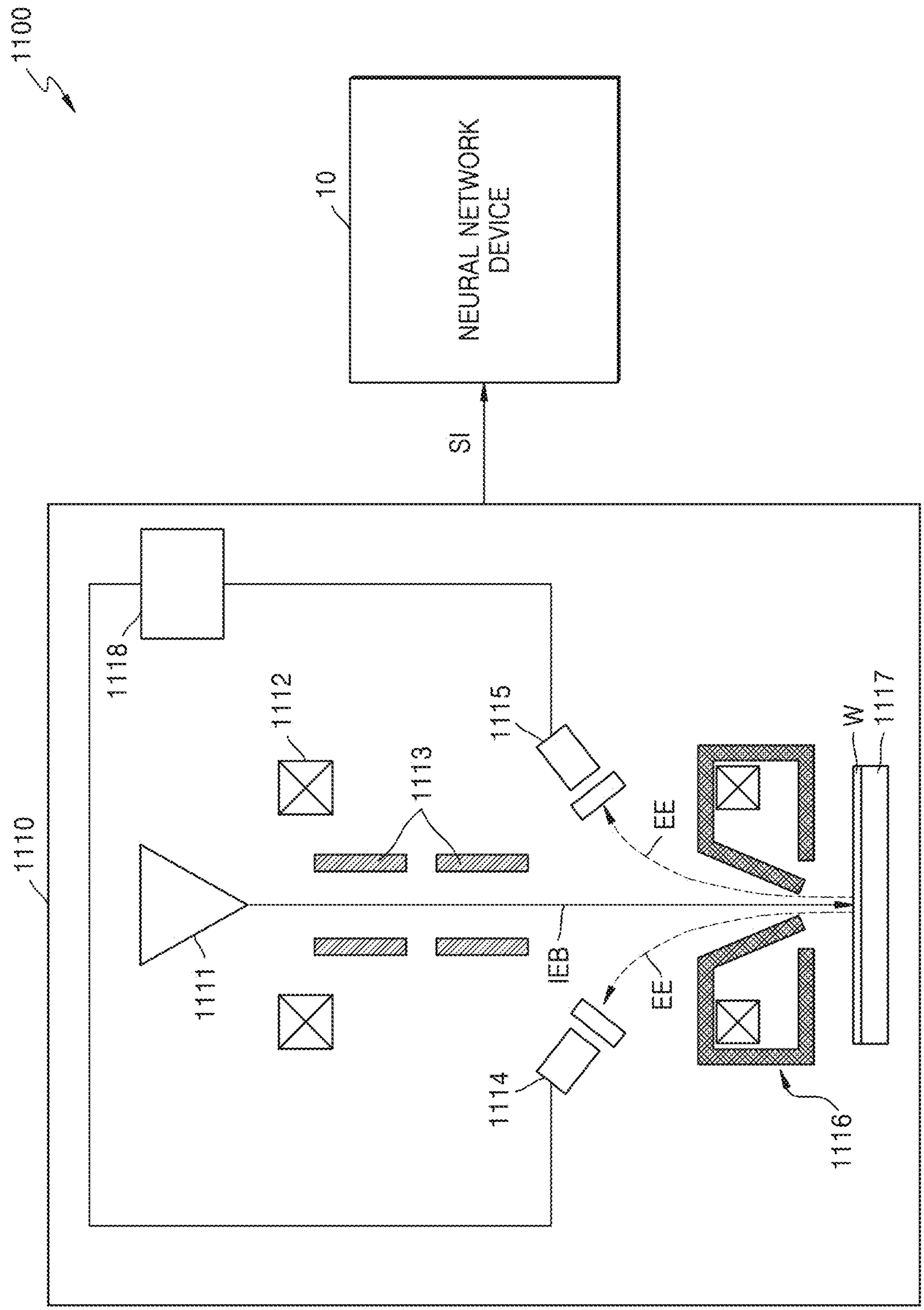
FIG. 11 is a diagram of a neural network system according to an embodiment.

FIG. 11 is a diagram of a neural network system according to an embodiment. Referring to FIG. 11, a neural network system 1100 may include an SEM 1110 and the neural network device 10. Redundant descriptions given above with reference to FIGS. 1 to 10 are omitted below.

The SEM 1110 may be configured to measure an analysis target W. For example, the SEM 1110 may measure a wafer, which has undergone semiconductor device manufacturing processes, in a scanning manner. The SEM 1110 may radiate an input electron beam IEB to the analysis target W, detect emitted electrons EE, which are emitted from the analysis target W according to the interaction between the input electron beam IEB and the analysis target W, and generate an SEM image SI with respect to the analysis target W. In an embodiment, the input electron beam IEB is radiated to each of the different areas of the analysis target W, the emitted electrons EE from each area may be detected, and the SEM image SI of each area of the analysis target W may be generated. For example, SEM images SI may respectively represent different depth areas of the analysis target W.

The SEM 1110 may include an electron gun 1111, a condenser lens 1112, a deflector 1113, an objective lens 1116, a first detector 1114, a second detector 1115, a stage 1117, and a scanner 1118.

The electron gun 1111 may generate and emit the input electron beam IEB. The wavelength of the input electron beam IEB may be determined by the energy of electrons emitted from the electron gun 1111. According to an embodiment, the wavelength of the input electron beam IEB may be several nanometers (nm). For example, the electron gun 1111 may be of a cold field emission (CFE) type, a Schottky emission (SE) type, or a thermionic emission (TE) type.

In an embodiment, the electron gun 1111 may generate the input electron beam IEB by applying energy, which is thermally or electrically higher than or equal to the work function (i.e., the difference between Fermi energy and the energy level in the vacuum), to electrons of a solid substance that is an electron source.

The condenser lens 1112 may be in the path of the input electron beam IEB between the electron gun 1111 and the analysis target W. According to embodiments, the condenser lens 1112 may focus the input electron beam IEB to the deflector 1113. Accordingly, the controllability of the input electron beam IEB by the deflector 1113 may increase.

The deflector 1113 may be in the path of the input electron beam IEB between the condenser lens 1112 and the analysis target W. The deflector 1113 may deflect the input electron beam IEB emitted from the electron gun 1111. The deflector 1113 may deflect the input electron beam IEB such that the input electron beam IEB passes through the objective lens 1116 and is radiated to a set position in the analysis target W. According to embodiments, the deflector 1113 may allow the input electron beam IEB to scan the analysis target W. The deflector 1113 may be of an electrical type or a magnetic type.

The objective lens 1116 may be in the path of the input electron beam IEB between the deflector 1113 and the analysis target W. The objective lens 1116 may focus the input electron beam IEB to the analysis target W. Because the input electron beam IEB is limited to a narrow area of the analysis target W, the resolution of the SEM 1110 may increase.

The first detector 1114 may detect some of the emitted electrons EE, which are emitted from the analysis target W according to the radiation of the input electron beam IEB, and the second detector 1115 may detect some of the emitted electrons EE. For example, the first detector 1114 may detect electrons backscattered from a semiconductor substrate according to the radiation of the input electron beam IEB, and the second detector 1115 may detect secondary electrons generated from the semiconductor substrate according to the radiation of the input electron beam IEB.

The stage 1117 may support the analysis target W. For example, the analysis target W may be a semiconductor substrate, a wafer, or the like. The stage 1117 may move the analysis target W in horizontal and vertical directions or rotate the analysis target W around the vertical direction.

The scanner 1118 may analyze a detection signal corresponding to the electrons detected by the first and second detectors 114 and 1115 and generate an SEM image SI, i.e., an image of a pattern on the analysis target W. The SEM 1110 may transmit the SEM image SI to the neural network device 10. Although not shown in FIG. 11, the SEM 1110 may further include a controller configured to control the elements of the SEM 1110. For example, the controller may generate signals for controlling the oscillation of the electron gun 1111, the operation of the condenser lens 1112, the operation of the deflector 1113, the operation of the objective lens 1116, and the operation of the first and second detectors 1114 and 1115.

The neural network device 10 may perform image processing of the SEM image SI. In an embodiment, the neural network device 10 may select a target image from SEM images SI and divide the target image into cropped images. The neural network device 10 may generate a crop detection image by inferring a target object from a cropped image by using a segmentation model. The neural network device 10 may merge crop detection images into a predicted image based on position information of the cropped images.

Although the SEM 1110 is separate from the neural network device 10 in FIG. 11, embodiments are not limited thereto. The neural network device 10 may be included in the SEM 1110. The neural network device 10 may receive the SEM image SI from the scanner 1118 and perform image processing of the SEM image SI. Because the neural network system 1100 generates a predicted image by quickly inferring a target object, i.e., a portion of the analysis target W, which is to be analyzed, the target object may be accurately and efficiently analyzed based on the predicted image.

Figure 12:
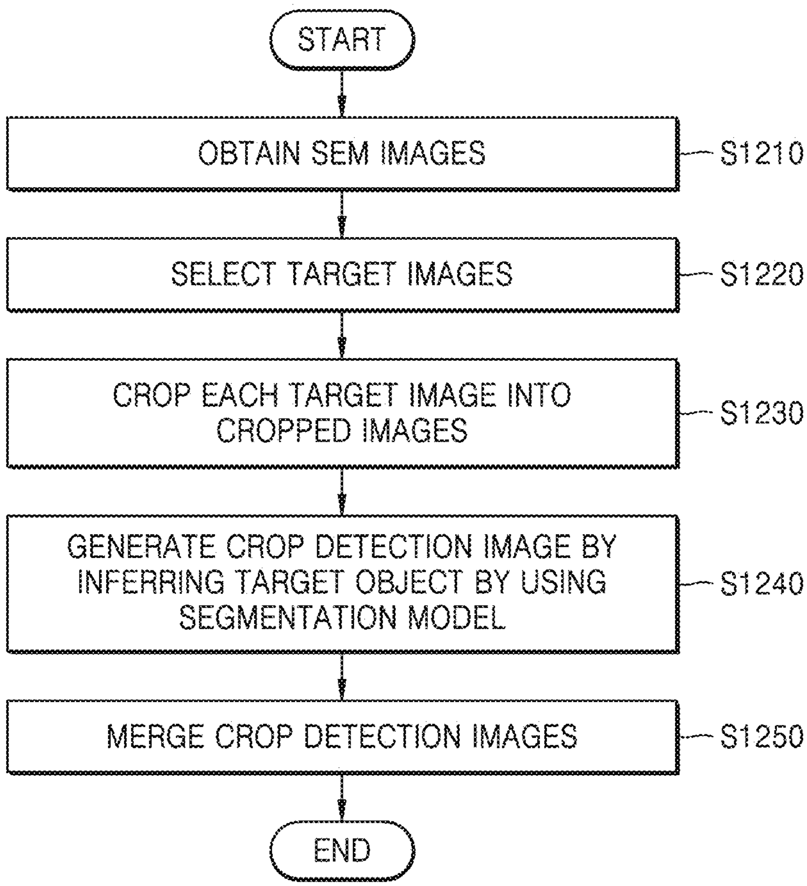
FIG. 12 is a flowchart of an operating method of a neural network device, according to an embodiment.

FIG. 12 is a flowchart of an operating method of a neural network device, according to an embodiment. Redundant descriptions given above are omitted below.

The neural network device may obtain SEM images in operation S1210. The neural network device may obtain the SEM images of an analysis target from an SEM (e.g., the SEM 1110 in FIG. 11). The neural network device may receive the SEM images that are generated by detecting electrons emitted from the analysis target. In an embodiment, the SEM images may be different from each other according to the areas of the analysis target. An SEM image may be generated by radiating an input electron beam to an area of the analysis target and detecting electrons emitted from the analysis target.

The neural network device may select target images from the SEM images in operation S1220. The neural network device may select a target image based on anomaly detection. The neural network device may select a target image based on a frequency. Target images may refer to SEM images, excluding an out-of-focus image, an image of an area that does not need to be analyzed, an image including a defect, and the like from the SEM images.

The neural network device may convert each of the SEM images into a frequency domain and generate a frequency image corresponding to each SEM image. For example, the neural network device may convert an SEM image into a frequency domain by using a Fourier transform.

The neural network device may select a target image based on a frequency value of at least a portion of each frequency image. The neural network device may set, as a zero-padding area, at least a portion of the frequency image. A frequency value corresponding to each of the pixels of the zero-padding area may be substituted with zero. The zero-padding area may be set based on the center of a frequency image. The zero-padding area may be set to be in a certain range from the center of the frequency image in the horizontal and vertical directions.

The neural network device may set a plurality of zero-padding areas, which have different sizes from one another, with respect to each frequency image. For example, the sizes of first to third zero-padding areas, which are set with respect to a first frequency image, may be different from one another.

The neural network device may generate a calculation value corresponding to a zero-padding area. When there are a plurality of zero-padding areas, the neural network device may generate a calculation value corresponding to each of the zero-padding areas. The calculation value may refer to the average of frequency values respectively corresponding to the pixels of the other area than the zero-padding area in the frequency image.

The neural network device may determine whether an average calculation value is greater than or equal to a preset threshold value. When a single zero-padding area is set for a single frequency image, the average calculation value may be the calculation value. When a plurality of zero-padding areas are set for a single frequency image, the average calculation value may refer to the average of calculation values respectively corresponding to the zero-padding areas. When the average calculation value is greater than or equal to the preset threshold value, the neural network device may select a current SEM image as a target image.

The neural network device may crop each of the target images into a plurality of cropped images in operation S1230. Operation S1230 may include cropping each target image such that each of the cropped images at least partially overlaps with an adjacent one among the cropped images. For example, a first target image may include a first cropped image and a second cropped image adjacent to the first cropped image and the neural network device may crop the first target image such that a portion of the first cropped image overlaps with a portion of the second cropped image.

The neural network device may store position information corresponding to each of the cropped images. For example, the neural network device may crop a target image and store the position information of a cropped image in memory (e.g., the memory 600 in FIG. 1). The position information of a cropped image may include information about a target image including the cropped image and information about a portion including the cropped image in the target image.

The neural network device may generate a crop detection image by inferring a target object from each of the cropped images by using a segmentation model in operation S1240. The segmentation model (e.g., the segmentation model 310 in FIG. 1) may be trained to detect a target object in a cropped image. The segmentation model may infer and output an object, to which each pixel of an image belongs, and prediction with respect to all pixels of the image may be performed. The neural network device may infer an object, to which each pixel of a cropped image belongs, using the segmentation model and generate a crop detection image.

The neural network device may train the segmentation model. The neural network device may train the segmentation model, based on a training SEM image, a labeled image corresponding to the training SEM image, an augmented training image, and a labeled image corresponding to the augmented training image. The segmentation model may be trained to output a corresponding labeled image from each of the training SEM image and the augmented training image. The augmented training image may be generated by transforming the training SEM image by using an augmentation technique. The augmented training image may be generated by an augmentation technique of rotating, flipping, resizing, changing luminance of, adding noise to, and cropping at least one training SEM image.

The neural network device may train the segmentation model by using a skip connection. The neural network device may train the segmentation model such that overfitting is prevented.

The neural network device may perform transfer learning. The neural network device may update the trained segmentation model by performing transfer learning. The trained segmentation model may be applied to a training SEM image and an augmented training image but may not have been trained with respect to a new image. The new image may be an SEM image that is generated by an SEM different from an SEM generating the training SEM image. The neural network device may perform transfer learning based on the new image and update the segmentation model such that the segmentation model may be applied to the new image. When transfer learning is performed based on the new image, a segmentation model applied to the new image may be quickly generated.

The neural network device may merge crop detection images with each other in operation S1250. The neural network device may merge the crop detection images with each other based on the position information of each of the cropped images respectively corresponding to the crop detection images. The position information may include information about a target image including each of the cropped images respectively corresponding to the crop detection images and information about a portion including each cropped image in the target image. For example, the neural network device may merge first and second crop detection images such that the second crop detection image is adjacent to the first crop detection image, based on the position information.

The neural network device may remove a removal area, which is an overlapping portion between two adjacent crop detection images, from one of the two adjacent crop detection images and merge the two adjacent crop detection images. For example, the neural network device may remove a removal area, which is an overlapping portion between the first and second crop detection images, from the first crop detection image and merge the first and second crop detection images with each other. The neural network device may generate a predicted image by merging the crop detection images with each other. The predicted image may be the same size as each of the target images. The analysis target may be analyzed based on the predicted image.

Figure 13:
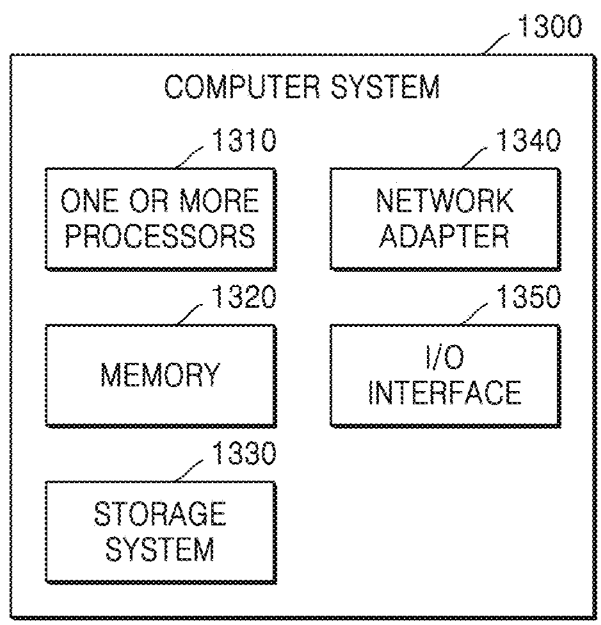
FIG. 13 is a block diagram of a computer system according to an embodiment.

FIG. 13 is a block diagram of a computer system according to an embodiment. In some embodiments, a computer system 1300 of FIG. 13 may perform the image processing and the training of a segmentation model, which have been described with reference to the drawings above, and may be referred to as an image processing system or a training system.

The computer system 1300 may refer to a system including a general-use or special-purpose computing system. For example, the computer system 1300 may include a personal computer (PC), a server computer, a laptop computer, a home appliance, or the like. Referring to FIG. 13, the computer system 1300 may include one or more processors 1310, a memory 1320, a storage system 1330, a network adapter 1340, and an input/output (I/O) interface 1350.

The one or more processors 1310 may execute a program module including computer system-executable instructions. The program module may include routines, programs, objects, components, logics, data structures, or the like, which perform a particular work or a particular abstract data type.

The memory 1320 may include a computer system-readable medium of a volatile memory type, such as RAM. The one or more processors 1310 may access the memory 1320 and execute instructions loaded to the memory 1320. The storage system 1330 may store information in a non-volatile manner and include at least one program product including a program module configured to perform the image processing and/or the training of a segmentation model, which have been described above with reference to the drawings in some embodiments. As a non-limiting example, programs may include an operating system, at least one application, other program modules, and program data.

The network adapter 1340 may provide access to a local area network (LAN), a wide area network (WAN), a public network (e.g., the Internet), and/or the like. The I/O interface 1350 may provide a communication channel with peripheral devices, such as a keyboard, a pointing device, and an audio system.

In some embodiments, the image processing and/or the training of a segmentation model, which has been described with reference to the drawings above, may be implemented in a computer program product. In an embodiment, the image processing may include obtaining N SEM images from an SEM with respect to an analysis target and selecting M target images from the N SEM images based on a frequency corresponding to each of the N SEM images. The image processing may also include cropping each of the M target images into K cropped images and generating M×K crop detection images by inferring a target object, to which each of the pixels of each of the M×K cropped images belongs. The image processing may also include generating M predicted images by performing merging of the M×K crop detection images in the same size as the SEM images, based on position information of the M×K cropped images.

A computer program product may include a non-transitory computer-readable medium (or storage medium), which includes computer-readable program instructions to allow the one or more processors 1310 to perform image processing and/or training of a segmentation model. As a non-limiting example, a computer-readable instruction may include an assembler instruction, an instruction set architecture (ISA) instruction, a machine instruction, a machine dependent instruction, micro code, a firmware instruction, state-setting data, or source or object code, which is written in at least one programming language.

A computer-readable medium may be any type of media that may retain and store in a non-transitory manner instructions executed by the one or more processors 1310 or any device that may execute instructions. The computer-readable medium may include an electronic storage device, a magnetic storage device, an optical storage device, an electromagnetic storage device, a semiconductor storage device, or a combination thereof but is not limited thereto. For example, the computer-readable medium may include a portable computer diskette, a hard disk, RAM, ROM, EEPROM, flash memory, SRAM, a compact disc (CD), a digital versatile disc (DVD), a memory stick, a floppy disk, a machine-encoded device like a punched card, or a combination thereof.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been particularly shown and described with reference to embodiments thereof, it will be understood that various changes in form and details may be made therein without departing from the spirit and scope of the following claims.

What is claimed is:

1. A neural network device comprising:

a pre-processor configured to;

convert time domain information of each scanning electron microscope (SEM) image of SEM images into frequency domain information, generate, from the frequency domain information, a frequency image corresponding to each of the SEM images, select target images from the SEM images based on a frequency value of at least a portion of each of the frequency images corresponding to the SEM images, set at least another portion of each of the frequency images as a zero-padding area by substituting zero for frequency values respectively corresponding to pixels of the at least another portion of the frequency image, wherein the zero-padding area is set based on a center of the frequency image, and crop each of the target images into a plurality of cropped images;

a neural network processor configured to generate crop detection images by inferring a target object from each of the plurality of cropped images by using a segmentation model trained to detect the target object in each of the plurality of cropped images; and a post-processor configured to merge the crop detection images with each other to generate a merged image having the same size as the SEM images, based on position information of the plurality of cropped images.

2. The neural network device of claim 1, wherein the pre-processor is further configured to generate a calculation value based on frequency values respectively corresponding to pixels of an area other than the zero-padding area in each of the frequency images and select, as a target image of the target images, an SEM image corresponding to the frequency image for which the calculation value is greater than or equal to a preset threshold value.

3. The neural network device of claim 1, wherein the pre-processor is further configured to set a plurality of zero-padding areas having different sizes and generate a calculation value corresponding to each of the plurality of zero-padding areas, based on frequency values respectively corresponding to pixels of an area other than each of the plurality of zero-padding areas in each of the frequency images.

4. The neural network device of claim 3, wherein the pre-processor is further configured to calculate an average calculation value corresponding to an average of calculation values respectively corresponding to the plurality of zero-padding areas and select, as one of the target images, an SEM image corresponding to a frequency image for which the average calculation value is greater than or equal to a preset threshold value.

5. The neural network device of claim 1, wherein:

the plurality of cropped images include a first cropped image and a second cropped image adjacent to the first cropped image, wherein a portion of the first cropped image overlaps with a portion of the second cropped image.

6. The neural network device of claim 5, wherein the post-processor is further configured to remove the portion of the first cropped image from the first cropped image, the portion of the first cropped image overlapping with the portion of the second cropped image, and merge the first cropped image with the second cropped image.

7. The neural network device of claim 1, wherein:

the neural network processor is further configured to train the segmentation model based on a training SEM image, an augmented training image, a labeled image corresponding to the training SEM image, and a labeled image corresponding to the augmented training image, and the augmented training image is generated by an augmentation technique of rotating, flipping, resizing, changing luminance of, adding noise to, and cropping at least one training SEM image.

8. The neural network device of claim 1, wherein the neural network processor is further configured to train the segmentation model by using a skip connection.

9. The neural network device of claim 1, wherein the neural network processor is further configured to train the segmentation model to prevent overfitting.

10. The neural network device of claim 1, wherein the neural network processor is further configured to perform transfer learning based on at least one of the plurality of cropped images and update the segmentation model that has been trained.

11. A system comprising:

at least one processor; and a non-transitory storage medium storing instructions configured to cause the at least one processor to perform image processing when the instructions are executed by the at least one processor, wherein the image processing includes:

obtaining N scanning electron microscope (SEM) images from an SEM with respect to an analysis target;

selecting M target images from the N SEM images, based on frequencies respectively corresponding to the N SEM images, wherein the selecting of the M target images includes:

generating N frequency images by converting time domain information of each of the N SEM images into frequency domain information, setting a zero-padding area in each of the N frequency images and substituting zero for frequency values respectively corresponding to pixels of the zero-padding area, generating a calculation value by calculating an average of frequency values respectively corresponding to pixels of an area other than the zero-padding area in each of the N frequency images, and determining whether the calculation value is greater than or equal to a preset threshold value and selecting, as one of the M target images, an SEM image based on the calculation value;

cropping each of the M target images into K cropped images;

generating M×K crop detection images by inferring a target object, to which each of pixels of M×K cropped images belongs, by using a segmentation model trained to detect the target object; and generating M predicted images by merging the M×K crop detection images with each other based on position information of the M×K cropped images, wherein each of the M predicted images has the same size as the N SEM images.

12. The system of claim 11, wherein the zero-padding area is the same among the N frequency images.

13. The system of claim 11, wherein each of the K cropped images at least partially overlaps with an adjacent one among the K cropped images.

14. An operating method of a neural network device, the operating method comprising:

obtaining scanning electron microscope (SEM) images from an SEM with respect to an analysis target;

selecting target images from the SEM images, based on frequencies respectively corresponding to the SEM images, wherein the selecting of the target images includes:

generating frequency images by converting time domain information of each of the SEM images into frequency domain information, setting a plurality of zero-padding areas of different sizes in each of the frequency images and generating calculation values respectively corresponding to the plurality of zero-padding areas, calculating an average calculation value for each of the frequency images by calculating an average of the calculation values respectively corresponding to the plurality of zero-padding areas, and selecting, as one of the target images, an SEM image corresponding to a frequency image for which the average calculation value is greater than or equal to a preset threshold value;

cropping each of the target images into a plurality of cropped images;

generating crop detection images by inferring a target object from each of the plurality of cropped images by using a segmentation model trained to detect the target object in each of the plurality of cropped images; and merging the crop detection images with each other to generate a merged image having the same size as the SEM images, based on position information of the plurality of cropped images.

* * * * *